(12) United States Patent
Preukschat et al.

(10) Patent No.: US 8,006,989 B2
(45) Date of Patent: Aug. 30, 2011

(54) WHEEL SUSPENSION FOR A MOTOR VEHICLE

(75) Inventors: Alfred Preukschat, Cologne (DE);
Thomas Brendecke, Peine (DE);
Luitpold Miller, Ottobrunn (DE);
Siegfried Ellmann, Aschheim (DE)

(73) Assignees: ThyssenKrupp Bilstein Suspension GmbH, Ennepetal (DE); ThyssenKrupp Presta München/Esslingen GmbH, München (DE)

( * ) Notice: Subject to any disclaimer, the term of this patent is extended or adjusted under 35 U.S.C. 154(b) by 61 days.

(21) Appl. No.: 12/002,626

(22) Filed: Dec. 18, 2007

(65) Prior Publication Data
US 2008/0157448 A1    Jul. 3, 2008

(30) Foreign Application Priority Data
Dec. 21, 2006   (DE) .......................... 10 2006 061 985

(51) Int. Cl.
*B60G 11/18*   (2006.01)
*B60G 11/50*   (2006.01)
*B60G 11/60*   (2006.01)

(52) U.S. Cl. ... 280/124.167; 280/124.134; 280/124.149; 267/277; 267/285; 267/154

(58) Field of Classification Search ........... 280/124.167, 280/124.166, 124.134, 124.137, 124.149, 280/5.511, 684, 679, 124.13, FOR. 115, FOR. 152, 280/FOR. 157, FOR. 174, FOR. 178, FOR. 180; 180/9.58; 267/285, 273, 277, 278, 154; B60G 11/18, 11/44, 11/50, 11/60, 11/64
See application file for complete search history.

(56) References Cited

U.S. PATENT DOCUMENTS

| | | | | |
|---|---|---|---|---|
| 2,818,273 A | * | 12/1957 | Weihsmann | 280/5.514 |
| 2004/0046336 A1 | * | 3/2004 | Jensen et al. | 280/5.511 |
| 2006/0273539 A1 | * | 12/2006 | Barth et al. | 280/124.107 |

FOREIGN PATENT DOCUMENTS

| | | |
|---|---|---|
| DE | 38 31 338 | 4/1989 |
| DE | 39 28 062 | 11/1990 |

OTHER PUBLICATIONS

Kraftfahr-technisches Taschenbuch, Bosch, 2007, pp. 780-781.

* cited by examiner

*Primary Examiner* — Faye M Fleming
*Assistant Examiner* — Keith Frisby
(74) *Attorney, Agent, or Firm* — Collard & Roe, P.C.

(57) ABSTRACT

A wheel suspension for a motor vehicle has a transverse control arm that can be attached to a vehicle body by way of bearings and can be rotated about a longitudinal axis, and a body spring configured as a torsion bar spring for absorbing rotational movements of the transverse control arm about the longitudinal axis. The body spring is disposed on the transverse control arm so as to rotate with it, with a first end. An electromechanical actuator for changing the angle of rotation of the body spring is disposed at a second end of the body spring. The wheel suspension has a damping element. The second end of the body spring is connected with a stress relief spring that is configured as a torsion bar spring, disposed coaxially with the body spring, and can be attached to the vehicle body.

10 Claims, 3 Drawing Sheets

WHEEL SUSPENSION FOR A MOTOR VEHICLE

CROSS REFERENCE TO RELATED APPLICATIONS

Applicants claim priority under 35 U.S.C. §119 of German Application No. 10 2006 061 985.4 filed Dec. 21, 2006.

BACKGROUND OF THE INVENTION

1. Field of the Invention

The present invention relates to a wheel suspension for a motor vehicle, having a transverse control arm that can be attached to a vehicle body by way of bearings and can be rotated about a longitudinal axis, and having a body spring configured as a torsion bar spring, for absorbing rotational movements of the transverse control arm about the longitudinal axis. The body spring is disposed on the transverse control arm so as to rotate with it, with a first end. An electromechanical actuator for changing the angle of rotation of the body spring is disposed at a second end of the body spring. The wheel suspension is particularly provided as a single-wheel suspension, on at least one axle of a passenger car or a utility vehicle.

2. The Prior Art

A wheel suspension for a motor vehicle, having the characteristics described initially, is known from the reference DE 39 28 062 A1, in which the body springs configured as torsion bar springs can be twisted by means of an electromechanical actuator. In this manner, side-to-side movements of the motor vehicle when driving through a curve can be compensated, on the one hand. On the other hand, in this way the wheel height level is adjustable independent of static or dynamic forces that act on the wheel suspension.

In the wheel suspension known from DE 38 31 338 A1, an additional torsion bar spring is provided in addition to the body spring, as a stress relief spring. Both the body spring and the stress relief spring are configured in tubular shape, and disposed coaxially. The stress relief spring surrounds the body spring and the torsion bar springs are rigidly connected at one end, by way of a coupling point. At the opposite end of the torsion bar springs, the body spring is connected with the vehicle body, and the stress relief spring is connected with the transverse control arm.

A device that can be hydraulically activated is disposed between the coupling point and the transverse control arm, for adjusting the angle of rotation. The transfer of force from the coupling point to the vehicle body takes place by way of the body spring disposed inside of the stress relief spring. By an active control of the hydraulic adjustment device, low-frequency vibrations can be compensated by a change in the bias of the torsion bar springs at the coupling point. The stress relief spring brings about the result that the adjustment device can be designed for relatively small setting moments.

The known system for active vibration compensation, in which a hydraulic adjustment device is connected with a hydraulic source by way of hydraulic lines and with the interposition of a controllable regulation and setting element, is technically complicated. Furthermore, the damping characteristics of the wheel suspension require further improvement, particularly in the high-frequency range. To guarantee a clearly defined damping behavior of low-frequency vibrations, the adjustment device must have sufficient rigidity. This rigidity is difficult to achieve with a hydraulic system.

SUMMARY OF THE INVENTION

Against this background, it is an object of the invention to provide a wheel suspension for a motor vehicle, having the characteristics described initially, which demonstrates improved damping behavior. In particular, it is an object to make possible precise adjustment of the body spring, in a simple manner.

These and other objects are achieved in accordance with the invention by providing a wheel suspension having the characteristics described initially, in which the wheel suspension has a damping element and the second end of the body spring is connected with a stress relief spring that is configured as a torsion bar spring, disposed coaxially with the body spring, and can be attached to the vehicle body. In this connection, each of these springs can be composed of two or more individual torsion bar springs disposed in parallel. The static and dynamic forces that act on the wheel suspension are jointly absorbed by the body spring, the stress relief spring, and the actuator, in this embodiment, whereby the actuator allows an adjustment of the angle of rotation of the body spring with regard to the vehicle body. In this connection, the wheel suspension, with the stress relief spring and the body spring, is preferably structured in such a manner that the wheel suspension is held in a predetermined design position solely by the body spring and the stress relief spring, at a predetermined stress, which corresponds to the mean force effect to be expected during operation with the vehicle, for example, whereby the actuator is not subject to stress. A comparatively slight torque is then sufficient to balance out changes in static and dynamic stress, proceeding from the design position.

The spring rate of the body spring results from the demands on the wheel suspension. The spring rate of the stress relief spring can be freely selected, to a great extent. The additional damping element supports both the body spring and the electromechanical actuator during high-frequency and low-frequency vibrations. In this way, the entire damping behavior is clearly improved and only slight setting forces and setting paths of the actuator are typically necessary for active vibration compensation. The electromechanical actuator can be controlled directly by a control and regulation device, so that the wheel suspension is characterized by a comparatively simple structure.

Because an interposition of a hydraulic system with feed lines and various hydraulic components is eliminated, in particular, a rapid and direct transfer of force from the actuator to the body spring can be guaranteed. In particular, the electromechanical actuator can easily demonstrate rigidity, thereby making a precise and clearly defined rotation of the body spring possible. The wheel height level of a wheel of a motor vehicle disposed on the transverse control arm can be kept constant via a rotation of the body spring by the electromechanical actuator, independent of the static forces due to the weight stress of the wheel suspension and the dynamic forces acting on the wheel suspension, for example due to an uneven road surface or driving maneuvers. She wheel suspension according to the invention furthermore allows regulation of the wheel height as a function of the speed, or as a function of the requirements of an increase in ground clearance. Production tolerances of the body spring and optionally provided additional spring elements can also be balanced out via the adjustment possibilities provided by the electromechanical actuator.

In one embodiment, the wheel suspension has only the body spring and optionally additional torsion bar springs. This embodiment has a low space requirement. In particular, the construction space in the area of a wheel case can be minimized because it is no longer necessary to dispose a conventional suspension strut there. In particular, the available width of a trunk space or engine space disposed above a vehicle axle can be increased by means of the elimination of suspension strut domes, in comparison with a conventional embodiment in which suspension struts are provided.

In an alternative embodiment, the wheel suspension can also have conventional spring elements such as helical springs or air springs, preferably in combination with a piston damper, in addition to the body spring. With this embodiment, the static vehicle weight is preferably absorbed by the conventional spring elements, at least to a great extent. The body spring according to the invention, whose bias can be adjusted with the electromechanical actuator, then allows active control of the spring characteristics, without any additional construction space being required, in the region of the wheel suspension and particularly in the region of a suspension strut dome. The teaching according to the invention can be combined with known embodiments of single-wheel suspensions.

Typically, short setting paths and great torques are required to adjust the bias of the body spring, and for this reason, the electromechanical actuator has a servomotor and a step-down gear mechanism that acts on the body spring, in a preferred embodiment of the invention. For an optimal use of space, the servomotor or the step-down gear mechanism or both can be disposed concentrically around the body spring. In this case, the servomotor can be configured as an electric ring motor, and/or the step-down gear mechanism can be configured as a planetary gear mechanism or harmonic drive. It is practical if the actuator is furthermore equipped with a locking device that can preferably be activated electrically or electromechanically.

In a preferred further development of the embodiment described, the body spring is configured in tubular shape and disposed concentrically around the stress relief spring, which itself can also be configured in tubular shape. With this concentric embodiment, the body spring and the stress relief spring can be disposed in a particularly compact manner.

In a particularly preferred embodiment, the second end of the body spring and an assigned end of the stress relief spring are coupled by way of a setting element, whereby the setting element allows rotation of the ends assigned to one another, for adjustment. The connection by way of the setting element allows balancing out production tolerances of the torsion bar springs, for example. Furthermore, the adjustment between the stress relief spring and the body spring allows an adaptation to different stresses, and a displacement of the design position, so that the wheel suspension can be adapted to different curb weights of different vehicle types, for example.

The adjustment can also be carried out using an actuator expanded or equipped with a locking device. In order to be able to maintain the adjustment value even in the switched-off state of the actuator, an electromagnetic or mechanical brake or locking device is provided specifically in the region of the electric motor.

The body spring and/or the stress relief spring can also be composed of two or more torsion bar springs disposed in parallel.

Preferably, the damping element according to the invention is configured as a passive rotation damper, which is disposed on the transverse control arm or on the body spring. The transverse control arm and the body spring, respectively, are connected with the vehicle body by way of the passive rotation damper, which can be formed of an elastomer material, for example. Alternatively, however, the damping element can also be configured as an actively controllable piston damper, which is disposed between the transverse control arm and the vehicle body, in practical manner. When an actively controllable piston damper is used, the spring properties can be changed via the electromechanical actuator, and the damping properties can be changed via the actively controllable piston damper, independent of one another, in particularly advantageous manner. Fundamentally, combinations of different passive and/or active damping elements can also be used within the scope of the invention.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 1b is a front view of the wheel suspension according to FIG. 1a;

FIG. 2b is a front view of the embodiment according to FIG. 2a;

FIG. 3b is a front view of the wheel suspension according to FIG. 3a.

DETAILED DESCRIPTION OF PREFERRED EMBODIMENTS

Figure 1A:
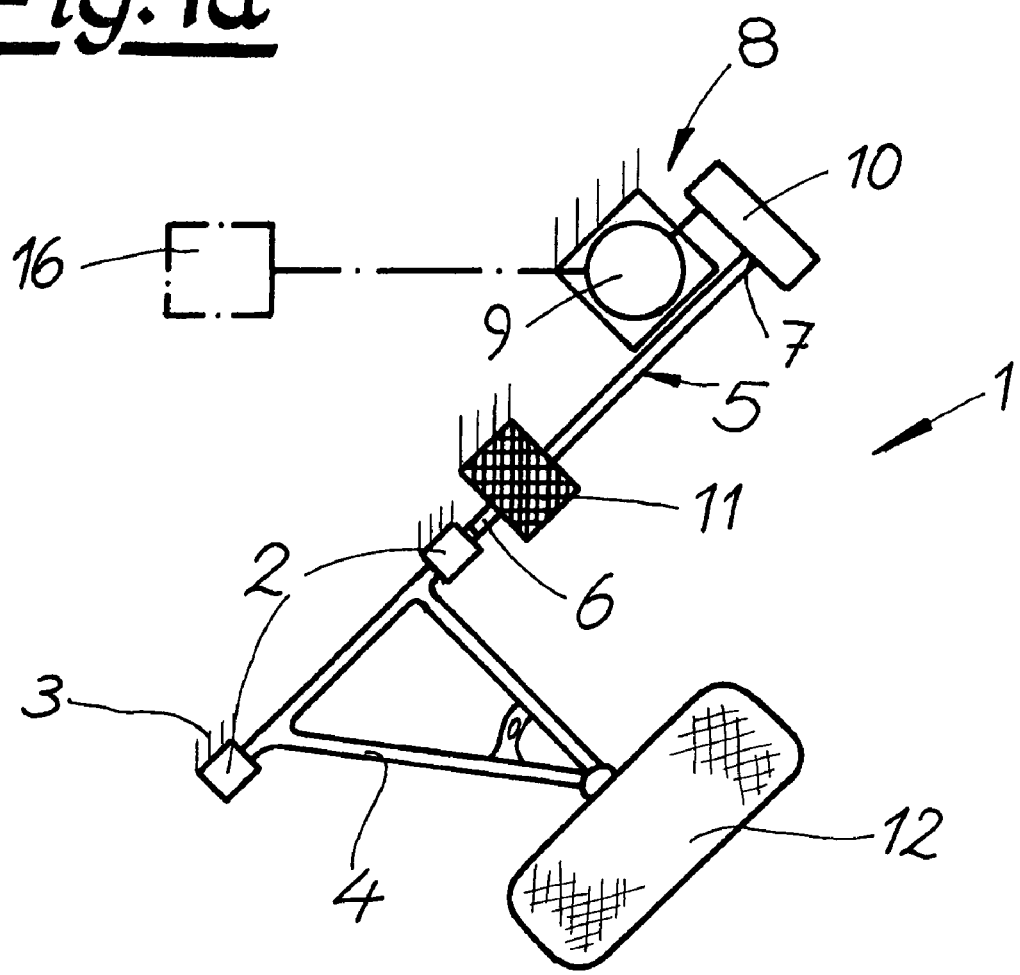
FIG. 1a shows a wheel suspension for a motor vehicle having a body spring configured as a torsion bar spring.

Turning now in detail to the drawings, FIG. 1a shows the fundamental structure of a wheel suspension 1 for a motor vehicle, having a transverse control arm 4 that can be attached to a vehicle body 3 by way of bearings 2 and can be rotated about a longitudinal axis, and having a body spring 5 configured as a tubular torsion bar for absorbing rotational movements of transverse control arm 4 around the longitudinal axis. The body spring is disposed on transverse control arm 4 so as to rotate with it, with a first end 6. At a second end 7 of body spring 5, an actuator 8 is disposed, made up of a servomotor 9 and a step-down gear mechanism 10 that acts on body spring 5, to adjust the angle of rotation of body spring 5. Close to transverse control arm 4, a passive rotation damper 11 is provided as a damping element, which connects body spring 5 with vehicle body 3. A vehicle wheel 12 is disposed on transverse control arm 4.

Figure 1B:
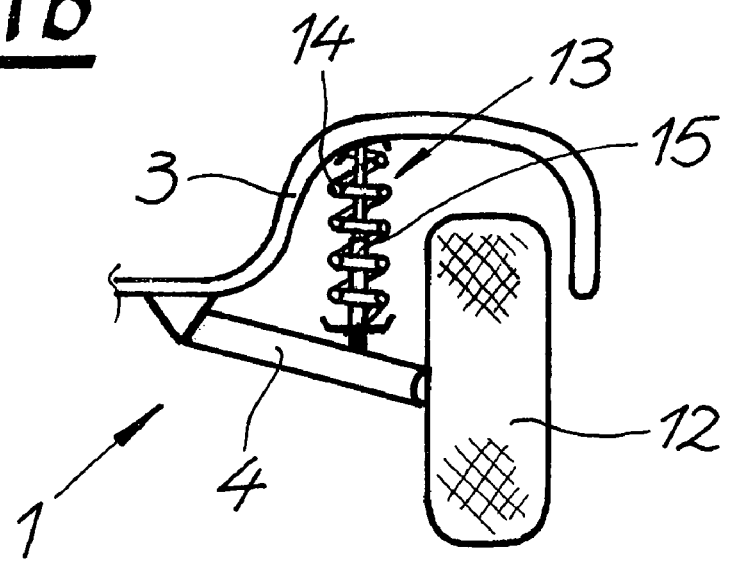

FIG. 1b shows the assembly according to FIG. 1a in a view from the front. Wheel suspension 1 shown has a suspension strut 13 with a helical spring 14 and an actively controllable piston damper 15, in addition to rotation damper 11 and body spring 5. While the static load of the vehicle is mainly absorbed by helical spring 14, the wheel height level can be changed by means of a change in the angle of rotation of the body spring 5 with actuator 8. An electronic control device 16 is provided for control of servomotor 9; this device can process status data detected by sensors, user-defined data and/or default values, for example. In addition to a height adjustment, the bias of body spring 5 can also be changed by means of an active adjustment of the angle of rotation, as a function of the data detected and processed by control device 16, to balance out up-and-down, side-to-side, and yaw movements. In the case of active wheel suspension 1 shown, the spring force can be changed statically or dynamically, on the one hand, by means of rotation of body spring 5, in dependent manner, or, on the other hand, dynamically, by means of the actively controllable piston damper 15.

Figure 2A:
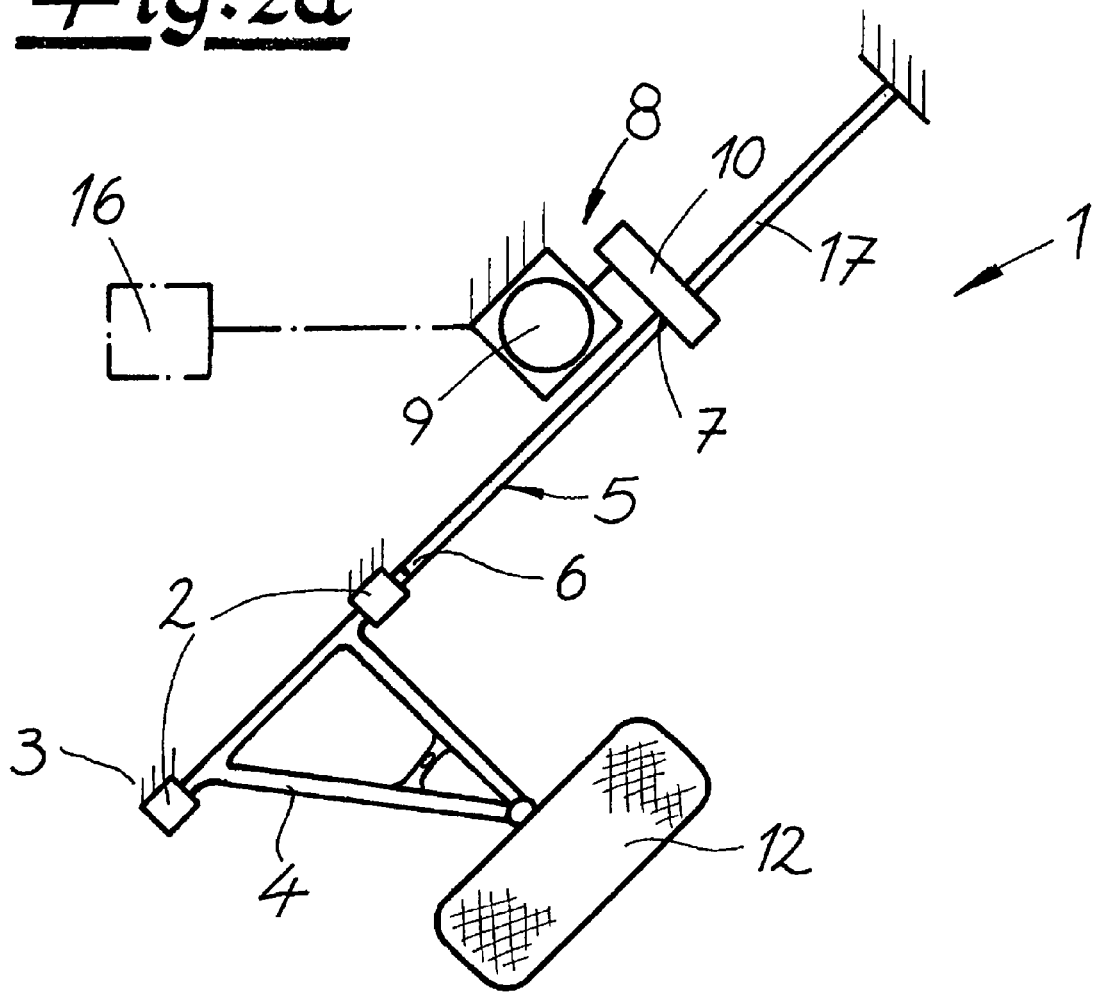
FIG. 2a is a top view of a wheel suspension according to an embodiment of the invention.
Figure 2B:
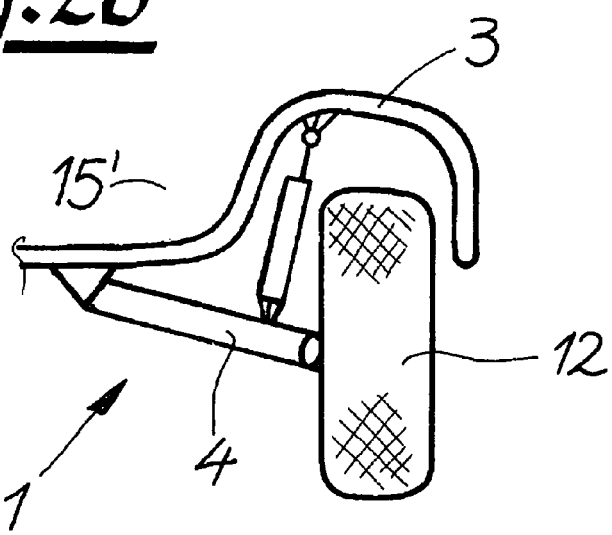

FIG. 2*a* shows an embodiment of wheel suspension 1 according to the invention, whereby second end 7 of body spring 5, on which electromechanical actuator 8 is disposed, is connected with a stress relief spring 17 that is configured as a torsion bar spring, disposed coaxially with body spring 5, and attached to vehicle body 3. Servomotor 9 of the actuator 8 is attached to vehicle body 3, as in the embodiment according to FIG. 1*a*, but here the torques that act on second end 7 of body spring 5 are absorbed by stress relief spring 17, for the most part. Proceeding from a design position in which actuator 8 is free of stress, to a great extent, at an average force acting on wheel suspension 1, the angle of rotation at the connection of body spring 5 and stress relief spring 17 can be adjusted, with comparatively slight torque, in order to adjust the wheel height to balance out dynamic forces. It can be seen in FIG. 2*b* that wheel suspension 1 has only a passive or actively controllable piston damper 15' as a damping element, which is attached to transverse control arm 4 with one end and to vehicle body 3 with the other end.

Figure 3A:
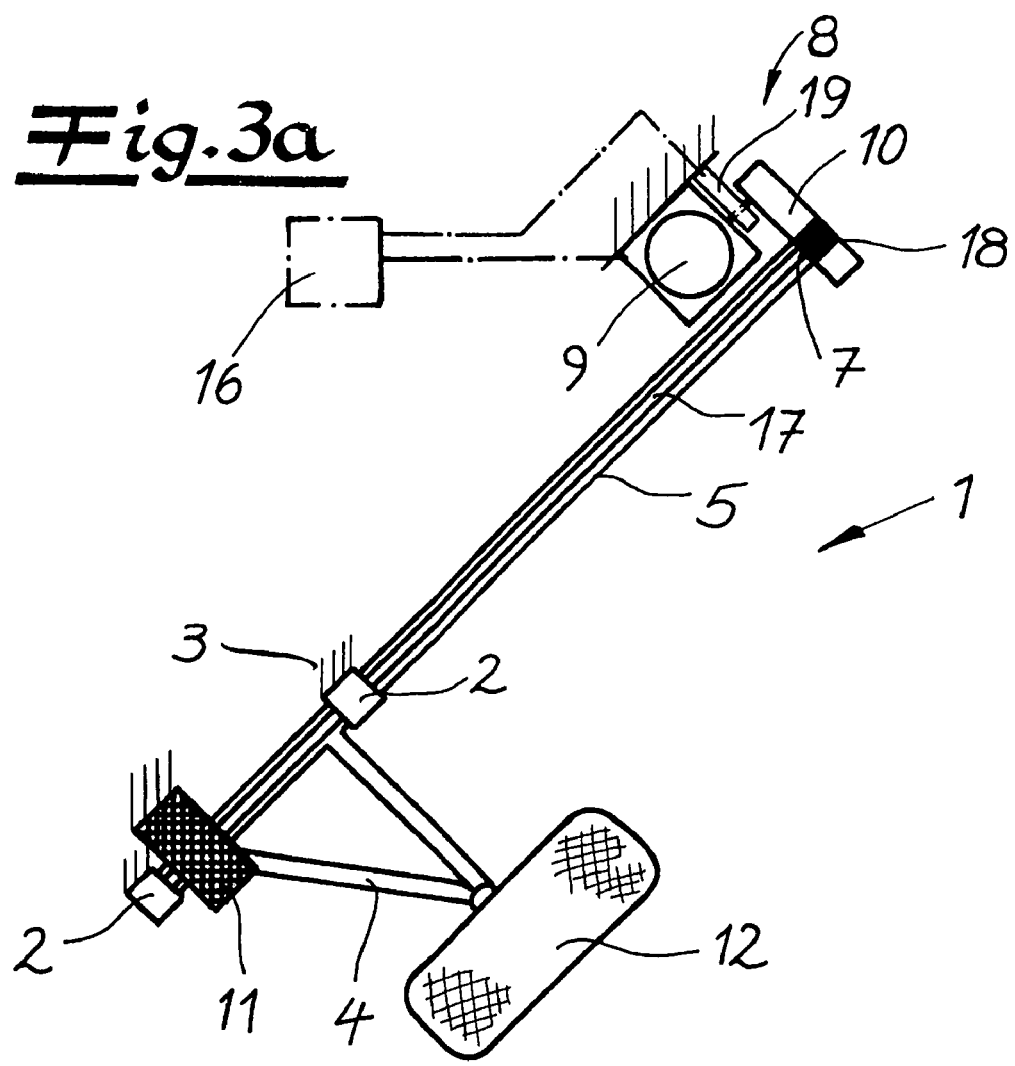
FIG. 3a is a top view of another embodiment of the wheel suspension according to the invention.
Figure 3B:
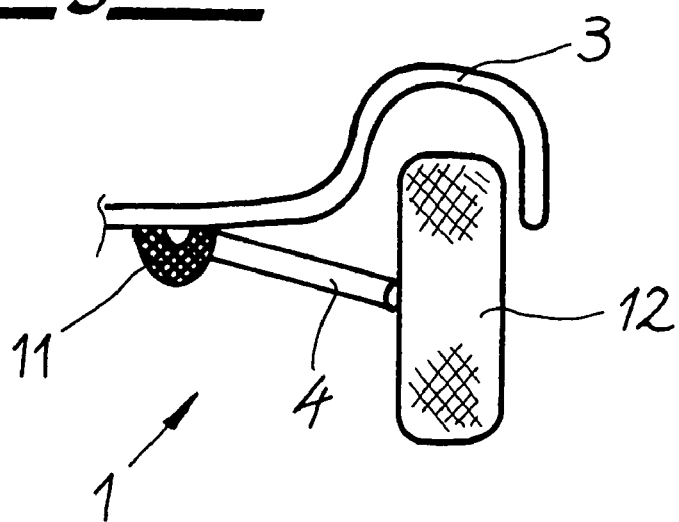

FIG. 3*a* shows a particularly compact and space-saving embodiment of the wheel suspension 1 according to the invention wherein the actuator 8 includes a locking element 19 electronically or electromechanically activatable. Actuator 8 is made up of a servomotor 9 and a step-down gear mechanism 10. As in the embodiment according to FIG. 2*a*, a stress relief spring 17 is provided, which is connected with second end 7 of body spring 5, whereby body spring 5 is configured in tubular shape and concentrically surrounds the stress relief spring 17. Second end 7 of body spring 5 and an assigned end of stress relief spring 17 are coupled by way of a setting element 18, whereby setting element 18 allows a rotation of the ends assigned to one another, relative to one another, for adjustment. By means of the adjustment, wheel suspension 1 can be adapted to different loads, whereby production tolerances of the torsion bar springs can also be balanced out, and the wheel height can be changed at a predetermined design position. A passive rotation damper 11 is provided as the sole damping element, which is attached to transverse control arm 4 and on vehicle body 3. As can be seen in FIG. 3*b*, the space requirement of wheel suspension 1 is extremely slight, as compared with a conventional suspension strut. In particular, the width available between vehicle wheels 12 in an interior of the vehicle can be clearly increased. The active wheel suspension according to the invention can be provided, without restrictions, on at least one or also on two axles of a passenger car or a utility vehicle.

Although several embodiments of the present invention have been shown and described, it is to be understood that many changes and modifications may be made thereunto without departing from the spirit and scope of the invention as defined in the appended claims.

What is being claimed is:

1. A wheel suspension for a motor vehicle comprising:
   (a) a transverse control arm rotatable about a longitudinal axis and attachable via bearings to a vehicle body;
   (b) a body spring comprising a first torsion bar spring for absorbing rotational movements of the transverse control arm about the longitudinal axis, said body spring comprising first and second ends and being disposed on the transverse control arm so as to rotate at an angle of rotation with the transverse control arm;
   (c) an electromechanical actuator for changing the angle of rotation of the body spring disposed on the second end of the body spring;
   (d) a damping element; and
   (e) a stress relief spring comprising a second torsion bar spring connected with the second end of the body spring, said stress relief spring being disposed coaxially with the body spring and attachable to the vehicle body.

2. The wheel suspension according to claim 1, wherein the actuator has a servomotor and a step-down gear mechanism that acts on the body spring.

3. The wheel suspension according to claim 2, wherein the actuator comprises a locking device.

4. The wheel suspension according to claim 3, wherein the locking device is electronically or electromechanically activatable.

5. The wheel suspension according to claim 1, wherein the body spring has a tubular shape and concentrically surrounds the stress relief spring.

6. The wheel suspension according to claim 1, further comprising a setting element coupling the second end of the body spring and an associated end of the stress relief spring, the setting element allowing a rotation of the second end of the body spring and the associated end of the stress relief spring relative to one another.

7. The wheel suspension according to claim 1, wherein at least one of the body spring and the stress relief spring comprises two or more torsion bar springs disposed in parallel.

8. The wheel suspension according to claim 1, wherein the damping element comprises a passive rotation damper disposed on the transverse control arm or on the body spring.

9. The wheel suspension according to claim 1, wherein the damping element comprises an actively controllable piston damper attached to the transverse control arm.

10. The wheel suspension according to claim 1, further comprising a suspension strut having a helical spring.

\* \* \* \* \*